United States Patent
Suzuki

(10) Patent No.: US 11,209,662 B2
(45) Date of Patent: Dec. 28, 2021

(54) IMAGING LENS AND IMAGING APPARATUS

(71) Applicant: FUJIFILM Corporation, Tokyo (JP)

(72) Inventor: Takashi Suzuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 16/505,419

(22) Filed: Jul. 8, 2019

(65) Prior Publication Data

US 2020/0033625 A1 Jan. 30, 2020

(30) Foreign Application Priority Data

Jul. 26, 2018 (JP) .............................. JP2018-140547

(51) Int. Cl.
| | | |
|---|---|---|
| *G02B 27/64* | (2006.01) | |
| *G02B 7/04* | (2021.01) | |
| *G03B 5/00* | (2021.01) | |
| *G02B 13/00* | (2006.01) | |
| *G02B 9/64* | (2006.01) | |

(52) U.S. Cl.
CPC .............. *G02B 27/646* (2013.01); *G02B 7/04* (2013.01); *G02B 9/64* (2013.01); *G02B 13/0045* (2013.01); *G03B 5/00* (2013.01); *G03B 2205/0007* (2013.01)

(58) Field of Classification Search
CPC .... G02B 27/646; G02B 7/04; G02B 13/0045; G02B 9/64; G02B 9/12; G02B 7/08; G02B 13/18; G02B 27/64; G03B 5/00; G03B 2205/0007

See application file for complete search history.

(56) References Cited

U.S. PATENT DOCUMENTS

| | | | |
|---|---|---|---|
| 5,519,540 A | 5/1996 | Suzuki | |
| 2009/0015938 A1* | 1/2009 | Harada | .......... G02B 15/143507 359/676 |
| 2009/0153980 A1* | 6/2009 | Yamamoto | ........... G02B 27/646 359/693 |

(Continued)

FOREIGN PATENT DOCUMENTS

| | | |
|---|---|---|
| EP | 2 741 117 A1 | 6/2014 |
| JP | H06-308383 A | 11/1994 |
| JP | H07-1 52001 A | 6/1995 |

(Continued)

OTHER PUBLICATIONS

An Office Action; "Notice of Reasons for Refusal," mailed by the Japanese Patent Office dated Apr. 27, 2021, which corresponds to Japanese Patent Application No. 2018-140547 and is related to U.S. Appl. No. 16/505,419 with with English translation.

(Continued)

*Primary Examiner* — Stephone B Allen
*Assistant Examiner* — Gabriel A Sanz
(74) *Attorney, Agent, or Firm* — Studebaker & Brackett PC

(57) ABSTRACT

The imaging lens consists of, in order from an object side, a first lens group, a stop, a positive second lens group, and a negative third lens group. The second lens group includes a negative lens and a positive lens. During focusing, the second lens group moves, and the third lens group does not move. Image blur correction is performed by moving the entire third lens group or a part of the third lens group in the direction intersecting the optical axis.

14 Claims, 10 Drawing Sheets

(56) References Cited

U.S. PATENT DOCUMENTS

| | | |
|---|---|---|
| 2014/0152887 A1 | 6/2014 | Hagiwara |
| 2018/0157015 A1* | 6/2018 | Shibayama ............ G02B 13/02 |

FOREIGN PATENT DOCUMENTS

| | | |
|---|---|---|
| JP | 2009-145588 A | 7/2009 |
| JP | 2011-013357 A | 1/2011 |
| JP | 2011-150036 A | 8/2011 |
| JP | 2011-227362 A | 11/2011 |
| JP | 2012-234169 A | 11/2012 |
| JP | 2017-156431 A | 9/2017 |

OTHER PUBLICATIONS

An Office Action; "Notice of Reasons for Refusal," mailed by the Japanese Patent Office dated Jun. 29, 2021, which corresponds to Japanese Patent Application No. 2018-140547 and is related to U.S. Appl. No. 16/505,419; with with English translation.

* cited by examiner

EXAMPLE 3

EXAMPLE 4

EXAMPLE 4

IMAGING LENS AND IMAGING APPARATUS

CROSS-REFERENCE TO RELATED APPLICATIONS

The present application claims priority under 35 U.S.C. § 119 to Japanese Patent Application No. 2018-140547, filed on Jul. 26, 2018. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

In recent years, a large number of digital cameras equipped with a large imaging element prescribed by, for example, an advanced photo system (APS) format or a four thirds format have been supplied to the market. Further, recently, a compact camera with a short total lens length has been provided. In addition to focusing functions, imaging lenses mounted on these cameras preferably have a function (hereinafter referred to as vibration reduction function) for correcting image blurring caused by camera shake and the like in order to deal with various imaging conditions. As an imaging lens provided with both a focusing function and a vibration reduction function, for example, a lens system described in JP2011-227362A is known.

SUMMARY OF THE INVENTION

The camera is required to be small in size and excellent in portability while being able to obtain high quality images. However, a small camera has little space for arranging mechanical parts around the lens system. Moreover, in a camera having a stop, a lens shutter, and a focusing mechanism, there is a restriction that a vibration reduction mechanism has to be disposed between these members and the imaging surface, and arrangement of the vibration reduction mechanism is not easy.

JP2011-227362A describes a lens system that moves a lens group including a lens closest to the object side during focusing and vibration reduction. In such a lens system, it is necessary to perform control to move the lens group including the lens closest to the object side in three directions, and it is difficult to control the tilt of the lens group to be moved to be within the allowable error range.

Therefore, it is conceivable to move a lens group different from the lens group moved during focusing during vibration reduction. JP2011-227362A also describes, as a lens system different from the above lens system, a lens system in which a lens group including a lens closest to the object side and an aperture stop is moved during vibration reduction and a lens group closer to the image side than the lens group is moved during focusing. However, this different lens system is disadvantageous in terms of weight since it is necessary to move the part including the stop mechanism during vibration reduction. Thus, there is a problem that it is difficult to achieve reduction in apparatus size.

The present disclosure has been made in view of the above circumstances. In order to solve the problem, an embodiment of the present invention is to provide an imaging lens, which has a focusing function and a vibration reduction function, is capable of achieving reduction in apparatus size, and has good optical performance, and an imaging apparatus including the imaging lens.

The specific means for achieving the object includes the following aspects.

According to a first aspect, there is provided an imaging lens consisting of, in order from an object side to an image side: a first lens group that has a refractive power; a stop; a second lens group that has a positive refractive power; and a third lens group that has a negative refractive power. The second lens group includes at least one negative lens and at least one positive lens. The second lens group moves along an optical axis, and the third lens group remains stationary with respect to an image plane, during focusing from an object at infinity to a closest object. In addition, image blur correction is performed by moving only the entire third lens group or only a part of the third lens group as a vibration reduction lens group in a direction intersecting the optical axis.

According to a second aspect, in the imaging lens according to the first aspect, the vibration reduction lens group has a negative refractive power. In addition, in a state where the object at infinity is in focus, assuming that a composite focal length from a lens closest to the object side to a lens disposed adjacent to the object side in the vibration reduction lens group is fa, and a composite focal length from the lens closest to the object side to a lens closest to the image side in the vibration reduction lens group is fb, Conditional Expression (1) is satisfied, which is represented by $$1.1 < fb/fa < 1.5 \tag{1}$$

According to a third aspect, in the imaging lens according to the second aspect, Conditional Expression (1-1) is satisfied, which is represented by $$1.2 < fb/fa < 1.4 \tag{1-1}$$

According to a fourth aspect, in the imaging lens according to any one of the first to third aspects, in a state where the object at infinity is in focus, assuming that a focal length of the imaging lens is f, a maximum image height is Ymax, an F number of the imaging lens is FNo, a distance on the optical axis from the lens surface closest to the object side to the lens surface closest to the image side is DD, and a back focal length of the imaging lens at an air conversion distance is Bf, Conditional Expressions (2) and (3) are satisfied, which are represented by $$1 < f/Ymax < 2.3 \tag{2}$$

$$3.4 < FNo \times (DD+Bf)/Ymax < 10 \tag{3}$$

According to a fifth aspect, in the imaging lens according to any one of the first to fourth aspects, focusing from the object at infinity to the closest object is performed by integrally moving the entire first lens group, the stop, and the entire second lens group toward the object side, or focusing from the object at infinity to the closest object is performed by integrally moving a part of the first lens group including a lens closest to the image side in the first lens group, the stop, and the entire second lens group toward the object side.

According to a sixth aspect, in the imaging lens according to the fifth aspect, in a state where the object at infinity is in focus, assuming that a composite focal length of the lenses moving during focusing is fc, and a focal length of the imaging lens is f, Conditional Expression (4) is satisfied, which is represented by $$0.6 < fc/f < 1 \tag{4}$$

According to a seventh aspect, in the imaging lens according to the sixth aspect, Conditional Expression (4-1) is satisfied, which is represented by $$0.65 < fc/f < 0.9 \quad (4\text{-}1).$$

According to an eighth aspect, in the imaging lens according to any one of the first to seventh aspects, the second lens group includes a negative lens concave toward the object side and a positive lens convex toward the image side.

According to a ninth aspect, in the imaging lens according to any one of the first to eighth aspects, the vibration reduction lens group has a negative refractive power. In addition, the vibration reduction lens group includes at least one negative lens. Assuming that a refractive index of a negative lens, which has a smallest absolute value of the focal length among lenses in the vibration reduction lens group, at the d line is NdOIS, Conditional Expression (5) is satisfied, which is represented by $$1.7 < NdOIS \quad (5).$$

According to a tenth aspect, in the imaging lens according to the ninth aspect, Conditional Expression (5-1) is satisfied, which is represented by $$1.75 < NdOIS < 2.1 \quad (5\text{-}1).$$

According to an eleventh aspect, in the imaging lens according to any one of the first to tenth aspects, the first lens group has a positive refractive power.

According to a twelfth aspect, in the imaging lens according to any one of the first to eleventh aspects, the vibration reduction lens group consists of three or less lenses.

According to a thirteenth aspect, in the imaging lens according to any one of the first to twelfth aspects, the vibration reduction lens group includes at least one aspheric lens surface having an inflection point.

According to a fourteenth aspect, in the imaging lens according to any one of the first to thirteenth aspects, a total number of lenses included in the first lens group and lenses included in the second lens group is seven or less.

According to a fifteenth aspect, there is provided an imaging apparatus comprising the imaging lens according to any one of the first to fourteenth aspects.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism. Further, in the present specification, correcting image blurring caused by camera shake and/or vibration of an imaging apparatus is called "image blur correction" or "vibration reduction".

In addition, the term "~ group that has a positive refractive power" in the present specification means that the group has a positive refractive power as a whole. Likewise, the "~ group having a negative refractive power" means that the group has a negative refractive power as a whole. "A lens having a positive refractive power", "a lens having a positive power", and "a positive lens" are synonymous. "A lens having a negative refractive power", "a lens having a negative power", and "a negative lens" are synonymous. The "lens group" is not limited to a configuration using a plurality of lenses, but may consist of only one lens. The "direction intersecting the optical axis" is synonymous with the "direction having a component in a direction perpendicular to the optical axis".

A compound aspheric lens (a lens which is integrally composed of a spherical lens and a film having an aspheric shape formed on the spherical lens, and functions as one aspheric lens as a whole) is not be considered as a cemented lens, and is treated as a single lens. The sign of the refractive power and the surface shape of the lens surface of a lens including an aspheric surface are considered in terms of the paraxial region unless otherwise noted.

The "focal length" used in a conditional expression is a paraxial focal length. The "F number" used in the conditional expressions is the open F number in a case where the aperture diameter of the stop is variable. The "back focal length at the air conversion distance" used in Conditional Expression is an air conversion distance on the optical axis from the lens surface closest to the image side to the focal position on the image side. The values of conditional expressions are values in the case of using the d line as a reference in a state where the object at infinity is in focus. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to an embodiment of the present invention, it is possible to provide an imaging lens, which has a focusing function and a vibration reduction function, is capable of achieving reduction in apparatus size, and has good optical performance, and an imaging apparatus including the imaging lens.

DESCRIPTION OF THE PREFERRED EMBODIMENTS

Figure 1:
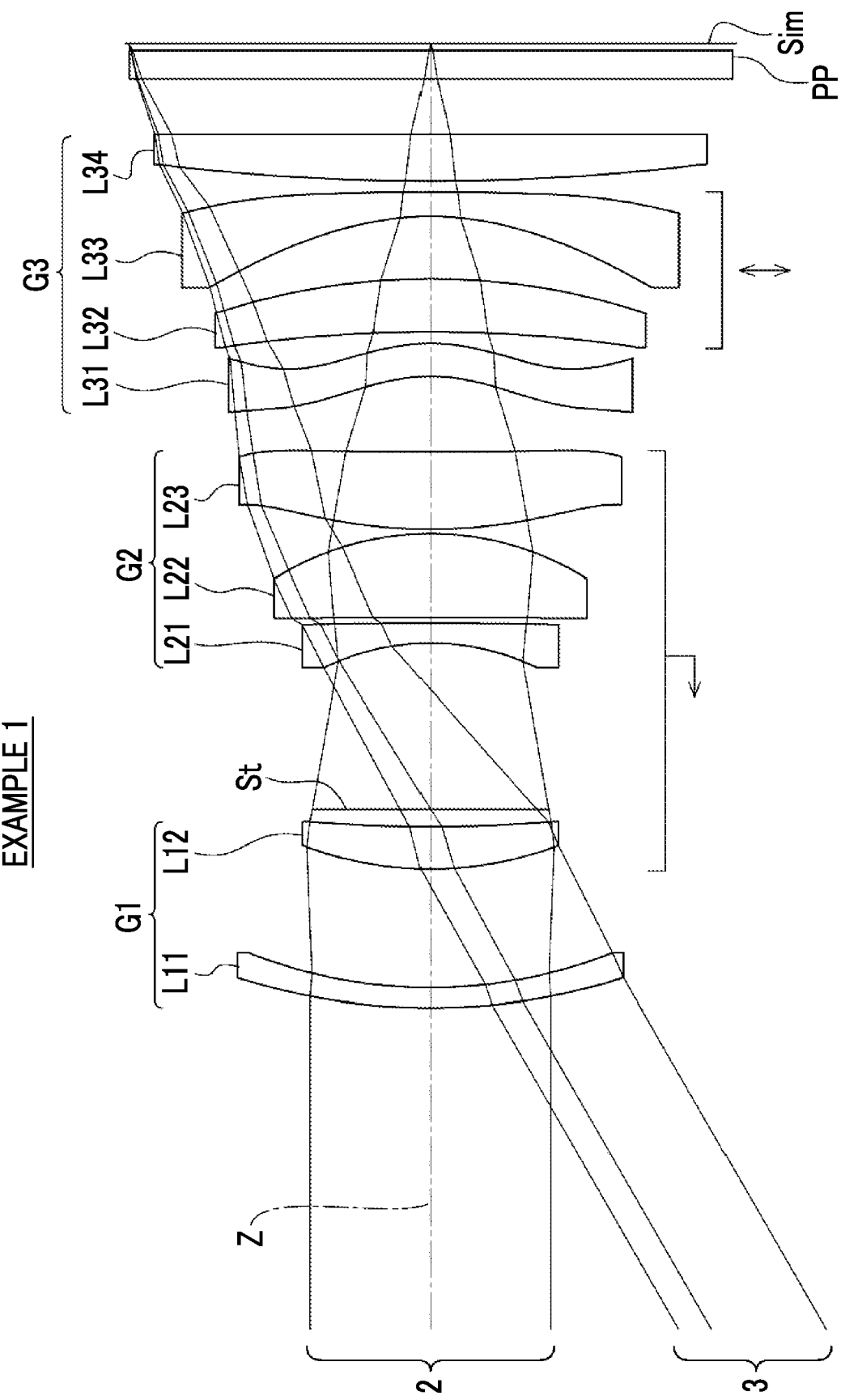
FIG. 1 is a cross-sectional view illustrating a configuration of an imaging lens of Example 1 of the present invention.

Hereinafter, an imaging lens of an embodiment of the present disclosure will be described with reference to the drawing. FIGS. 1 to 4 are cross-sectional views each illustrating a lens configuration of an imaging lens according to an embodiment of the present invention, and correspond to Examples 1 to 4 to be described later. In FIGS. 1 to 4, the left side is the object side, the right side is the image side, and a state in which an object at infinity is in focus is shown. Each of FIGS. 1 to 4 shows the on-axis rays 2 and the rays with the maximum angle of view 3 together with the lens configuration. Basic configurations and illustration methods of examples shown in FIGS. 1 to 4 are the same, and will be hereinafter described with reference to mainly the example shown in FIG. 1.

It should be noted that FIG. 1 shows an example in which an optical member PP having a parallel plate shape is disposed between an imaging lens and an image plane Sim under assumption that the imaging lens is applied to the imaging apparatus. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens of the present disclosure includes, in order from the object side to the image side along the optical axis Z, a first lens group G1 having a refractive power, an aperture stop St, a second lens group G2 having a positive refractive power, and a third lens group G3 having a negative refractive power.

In the imaging lens shown in FIG. 1 as an example, the first lens group G1 consists of two lenses L11 and L12 in order from the object side to the image side, the second lens group G2 consists of three lenses L21 to L23 in order from the object side to the image side, and the third lens group G3 consists of four lenses L31 to L34 in order from the object side to the image side. However, it is possible to make the number of lenses constituting each lens group different from the number thereof in the example shown in FIG. 1.

In the imaging lens of the present disclosure, the second lens group G2 moves along the optical axis Z, and the third lens group G3 remains stationary with respect to the image plane Sim, during focusing from the object at infinity to a closest object. Image blur correction, that is, vibration reduction is performed by moving only the entire third lens group G3 or only a part of the third lens group G3 as a vibration reduction lens group in a direction intersecting the optical axis Z. Therefore, in the imaging lens of the present disclosure, the mechanism of the heavy aperture stop St is not moved during vibration reduction. In addition, vibration reduction is performed using the third lens group G3 which does not move during focusing, and the entire third lens group G3 or a part of the third lens group G3 moves only during vibration reduction. With such a configuration, it is possible to achieve reduction in apparatus size while achieving high-precision vibration reduction.

In the example shown in FIG. 1, the vibration reduction lens group consists of a lens L32 and a lens L33. In FIG. 1, a bracket and an arrow in the vertical direction are written under the vibration reduction lens group.

Regarding focusing, it is possible to adopt a configuration in which focusing from the object at infinity to the closest object is performed by integrally moving the entire first lens group G1, the aperture stop St, and the entire second lens group G2 toward the object side. Alternatively, it is possible to adopt a configuration in which focusing from the object at infinity to the closest object is performed by integrally moving the part of the first lens group G1 including the lens closest to the image side in the first lens group G1, the aperture stop St, and the entire second lens group G2 toward the object side. As described above, by integrally moving the aperture stop St and the lenses on both the object side and the image side of the aperture stop St, it is possible to suppress aberration fluctuation during focusing.

In the example shown in FIG. 1, focusing from the object at infinity to the closest object is performed by integrally moving the lens L12, the aperture stop St, and the entire second lens group G2 toward the object side. That is, in the example shown in FIG. 1, the lens group (hereinafter referred to as a focusing lens group) which moves during focusing consists of the lens L12, the aperture stop St, and the entire second lens group G2. In FIG. 1, a bracket and an arrow indicating the direction of movement of the focusing lens group during focusing from the object at infinity to the closest object are written under the focusing lens group.

Figure 2:
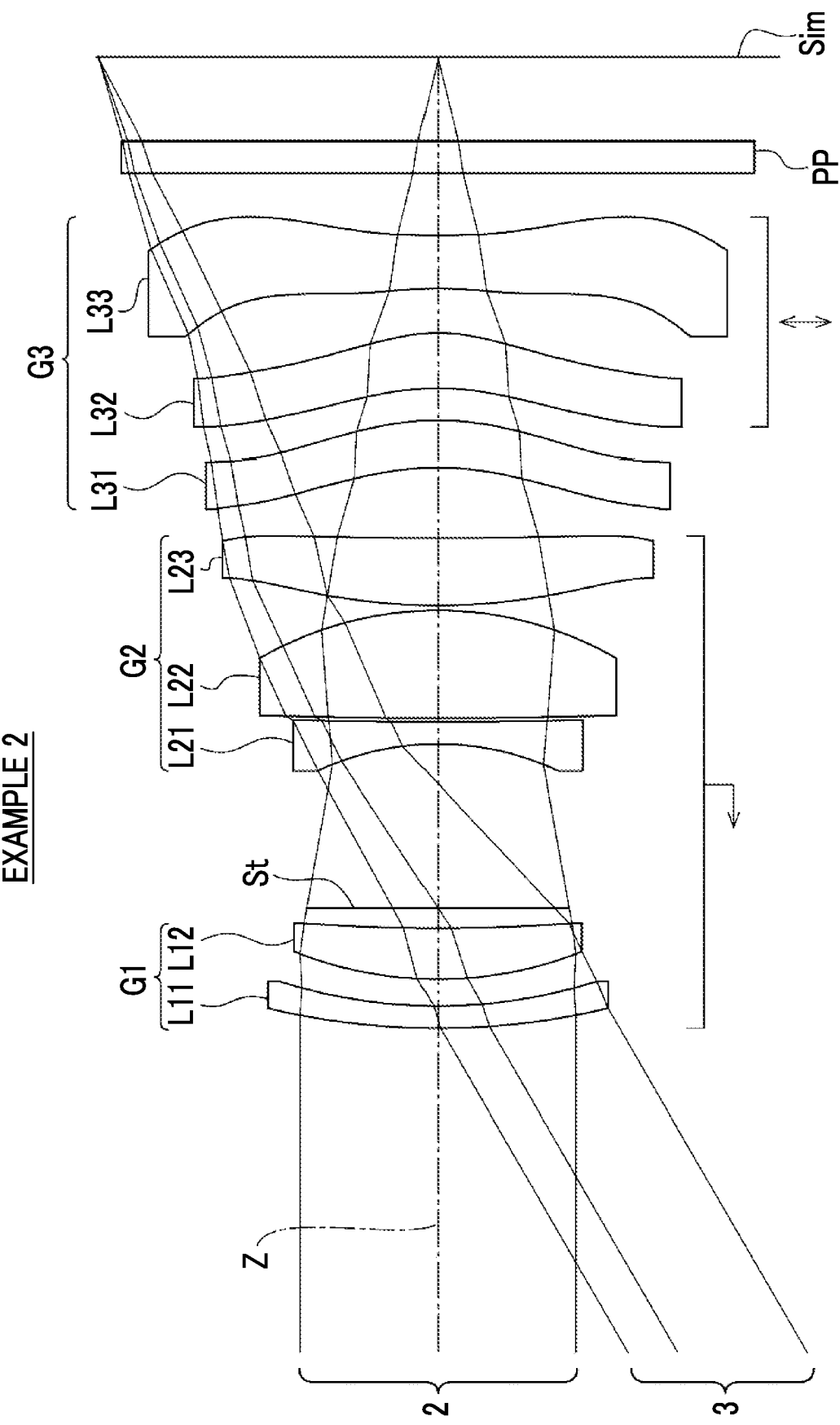
FIG. 2 is a cross-sectional view illustrating a configuration of an imaging lens of Example 2 of the present invention.

In the example shown in FIG. 2, the focusing lens group is configured to consist of the entire first lens group G1, the aperture stop St, and the entire second lens group G2, and to perform focusing from the object at infinity to the closest object by integrally moving the elements toward the object side.

In the imaging lens of the present disclosure, the first lens group G1 preferably has a positive refractive power. In such a case, convergent light can be made incident on the aperture stop St and the second lens group G2, and reduction in diameters of the lenses of the second lens group G2 and the third lens group G3 on the image side can be achieved.

As an example, the first lens group G1 can be configured to consist of two lenses. In such a case, there is an advantage in reduction in size. More specifically, the first lens group G1 can be configured to consist of one negative lens and one positive lens. In such a case, it is advantageous to satisfactorily correct various aberrations including chromatic aberration while achieving reduction in size. Specifically, for example, the first lens group G1 can be configured to consist of, in order from the object side to the image side, a negative meniscus lens convex toward the object side and a positive meniscus lens convex toward the object side. In such a case, there is an advantage in correction of distortion.

The second lens group G2 is configured to include at least one negative lens and at least one positive lens. According to this configuration, it is possible to correct longitudinal chromatic aberration and lateral chromatic aberration.

The second lens group G2 preferably includes a negative lens concave toward the object side and a positive lens convex toward the image side. In such a case, it is possible to minimize an amount of chromatic aberration and astigmatism generated.

As an example, the second lens group G2 can be configured to include three lenses. In such a case, there is an advantage in reduction in size. More specifically, the second lens group G2 can be configured to consist of one negative lens and two positive lenses. In such a case, the second lens group G2 having a positive refractive power has a negative lens, whereby there is an advantage in correction of chromatic aberration. Further, by sharing the positive refractive power required by the second lens group G2 with two positive lenses, there is an advantage in correction of spherical aberration. Specifically, for example, the second lens group G2 is configured to consist of, in order from the object side to the image side, a negative lens concave toward the object side, a positive lens convex toward the image side, and a positive meniscus lens convex toward the object side. By making the lens surface closest to the object side in the second lens group G2 concave, it is possible to suppress the aberration caused by the rays at the peripheral angle of view. By adopting a configuration in which their convex surfaces of the two positive lenses included in the second lens group G2 face each other, there is an advantage in correction of spherical aberration.

The total number of the lenses included in the first lens group G1 and the lenses included in the second lens group G2 is preferably seven or less. In such a case, it is possible to achieve reduction in size of the lens system. The total number of the lenses included in the first lens group G1 and the lenses included in the second lens group G2 is more preferably five or less. In such a case, it is possible to further achieve reduction in size of the lens system.

It is preferable that at least one of the first lens group G1 or the second lens group G2 have at least one aspheric surface. In such a case, there is an advantage in correction of spherical aberration.

As an example, the third lens group G3 can be configured to consist of three or four lenses. In such a case, there is an advantage in reduction in size. More specifically, the third lens group G3 can be configured to consist of one negative lens and two or three positive lenses. Both the lens closest to the object side in the third lens group G3 and the lens which is the second from the object side in the third lens group can be configured as a meniscus lens concave toward the object side.

The vibration reduction lens group preferably consists of three or less lenses. In such a case, the weight of the lens moved during vibration reduction can be suppressed, and the load on the driving system for driving the vibration reduction lens group can be reduced. Thus, there is an advantage in reduction in apparatus size.

The vibration reduction lens group preferably includes at least one aspheric lens surface having an inflection point. In such a case, it is possible to further reduce fluctuation in field curvature at the peripheral angle of view and fluctuation in field curvature at the intermediate angle of view during vibration reduction. The inflection point means a point at which the surface shape changes from a convex shape to a concave shape or from a concave shape to a convex shape.

Next, a configuration relating to Conditional Expressions will be described. In the imaging lens of the present disclosure, the vibration reduction lens group has a negative refractive power. In addition, in a state where the object at infinity is in focus, assuming that a composite focal length from a lens closest to the object side to a lens disposed adjacent to the object side in the vibration reduction lens group is fa, and a composite focal length from the lens closest to the object side to a lens closest to the image side in the vibration reduction lens group is fb, it is preferable to satisfy Conditional Expression (1). For example, in the example shown in FIG. 1, the composite focal length from the lens L11 to the lens L31 is fa, and the composite focal length from the lens L11 to the lens L33 is fb. Conditional Expression (1) is an expression relating to the vibration reduction lens group. By not allowing the result of Conditional Expression (1) to be equal to or less than the lower limit, the negative refractive power of the vibration reduction lens group can be ensured, and the vibration reduction effect is prevented from becoming excessively low. As a result, it is possible to obtain the vibration reduction effect desired by the technique of the present disclosure. By not allowing the result of Conditional Expression (1) to be equal to or greater than the upper limit, the negative refractive power of the vibration reduction lens group does not become excessively strong, and the vibration reduction effect is prevented from becoming excessively high. As a result, it is possible to minimize an amount of occurrence of aberration during vibration reduction. In addition, in a case of a configuration in which Conditional Expression (1-1) is satisfied, it is possible to obtain more favorable characteristics.

$$1.1 < fb/fa < 1.5 \tag{1}$$

$$1.2 < fb/fa < 1.4 \tag{1-1}$$

Further, in a state where the object at infinity is in focus, assuming that a focal length of the imaging lens is f and a maximum image height is Ymax, it is preferable to satisfy Conditional Expression (2). For example, in the example shown in FIG. 1, the height from the optical axis Z of the point, at which the principal ray of the rays with the maximum angle of view 3 intersects the image plane Sim, is Ymax. Conditional Expression (2) is an expression relating to the focal length and the screen size of the entire lens system. As f/Ymax becomes equal to or less than the lower limit of Conditional Expression (2) and becomes smaller, the angle of view of the optical system becomes wider. By not allowing the result of Conditional Expression (2) to be equal to or less than the lower limit, it becomes easy to correct field curvature. By not allowing the result of Conditional Expression (2) to be equal to or greater than the upper limit, the focal length is prevented from becoming excessively long, which is advantageous in terms of reduction in size and portability of the imaging apparatus.

$$1 < f/Ymax < 2.3 \tag{2}$$

Further, in a state where the object at infinity is in focus, an F number of the imaging lens is FNo, a distance on the optical axis from the lens surface closest to the object side to the lens surface closest to the image side is DD, a back focal length of the imaging lens at an air conversion distance is Bf, and the maximum image height is Ymax, it is preferable to satisfy Conditional Expression (3). In a case where the aperture diameter of the aperture stop St is variable, FNo is an open F number, that is, the minimum F number. Conditional Expression (3) is an expression relating to the total lens length and the F number. By not allowing the result of Conditional Expression (3) to be equal to or less than the lower limit, the F number is prevented from becoming excessively small with respect to the total lens length. As a result, it becomes easy to correct aberrations such as spherical aberration. By not allowing the result of Conditional Expression (3) to be equal to or greater than the upper limit, the total lens length is prevented from becoming excessively long with respect to the F number, which is advantageous in terms of reduction in size and portability of the imaging apparatus.

$$3.4 < FNo \times (DD+Bf)/Ymax < 10 \tag{3}$$

In addition, by adopting a configuration in which both Conditional Expression (2) and Conditional Expression (3) are satisfied, it is possible to obtain more favorable characteristics.

Further, in a state where the object at infinity is in focus, assuming that a composite focal length of the lenses moving during focusing is fc and a focal length of the imaging lens is f, it is preferable to satisfy Conditional Expression (4). For example, in the example shown in FIG. 1, the composite focal length of the lenses L12, L21, L22, and L23 is fc. Conditional Expression (4) is an expression relating to the refractive power of the focusing lens group. By not allowing the result of Conditional Expression (4) to be equal to or less than the lower limit, it is possible to suppress fluctuation in aberration during focusing. By not allowing the result of Conditional Expression (4) to be equal to or greater than the upper limit, it is possible to minimize the amount of movement of the focusing lens group during focusing. As a result, there is an advantage in reduction in size of the lens system. In addition, in a case of a configuration in which Conditional Expression (4-1) is satisfied, it is possible to obtain more favorable characteristics.

$$0.6<fc/f<1 \quad (4)$$

$$0.65<fc/f<0.9 \quad (4\text{-}1)$$

Further, the vibration reduction lens group has a negative refractive power. In addition, the vibration reduction lens group includes at least one negative lens. Assuming that a refractive index of a negative lens, which has a smallest absolute value of the focal length among lenses in the vibration reduction lens group, at the d line is NdOIS, it is preferable to satisfy Conditional Expression (5). By not allowing the result of Conditional Expression (5) to be equal to or less than the lower limit, it becomes easy to suppress fluctuation in aberration during vibration reduction. Further, it is preferable to satisfy Conditional Expression (5-1). By not allowing the result of Conditional Expression (5-1) to be equal to or less than the lower limit, it becomes easy to suppress fluctuation in aberration during vibration reduction. By not allowing the result of Conditional Expression (5-1) to be equal to or greater than the upper limit, the Abbe number of the negative lens for the negative refractive power of the vibration reduction lens group is prevented from becoming excessively small, that is, dispersion is prevented from becoming excessively large. As a result, it becomes easy to suppress fluctuation in lateral chromatic aberration during vibration reduction.

$$1.7<NdOIS \quad (5)$$

$$1.75<NdOIS<2.1 \quad (5\text{-}1)$$

The above-mentioned preferred configurations and available configurations may be optional combinations, and it is preferable to selectively adopt the configurations in accordance with a required specification. According to the technique of the present disclosure, it is possible to realize an imaging lens which has a focusing function and a vibration reduction function, is capable of achieving reduction in apparatus size, and has good optical performance.

Next, numerical examples of the imaging lens of the present invention will be described.

Example 1

FIG. 1 shows a cross-sectional view illustrating the lens configuration of the imaging lens of Example 1, and the illustration method and the configuration thereof are as described above. Therefore, the repeated description is partially omitted here. The imaging lens of Example 1 consists of, in order from the object side to the image side, a first lens group G1 having a positive refractive power, an aperture stop St, a second lens group G2 having a positive refractive power, and a third lens group G3 having a negative refractive power.

The first lens group G1 consists of, in order from the object side to the image side, two lenses of a negative lens L11 and a positive lens L12. The second lens group G2 consists of, in order from the object side to the image side, three lenses of a negative lens L21, a positive lens L22, and a positive lens L23. The third lens group G3 consists of, in order from the object side to the image side, four lenses of a positive lens L31, a positive lens L32, a negative lens L33, and a positive lens L34.

During focusing from the object at infinity to the closest object, the lens L12, the aperture stop St, and the entire second lens group G2 integrally move to the object side along the optical axis Z, and the other lenses remain stationary with respect to the image plane Sim. During vibration reduction, only the two lenses L32 and L33 move in the direction intersecting the optical axis Z.

Regarding the imaging lens of Example 1, Table 1 shows basic lens data, Table 2 shows a specification, Table 3 shows variable surface distances, and Table 4 shows aspheric surface coefficients. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indexes of the respective components at the d line, and the column of vd shows Abbe numbers of the respective components on the d line basis.

In Table 1, the sign of the radius of curvature of the surface convex toward the object side is positive and the sign of the radius of curvature of the surface convex toward the image side is negative. Table 1 also shows the aperture stop St and the optical member PP, and in the column of the surface number of the surface corresponding to the aperture stop St, the surface number and (St) are noted. In Table 1, the data corresponding to the vibration reduction lens group is surrounded by the thick frame. In Table 1, the variable surface distances, which are distances variable during focusing, are referenced by the reference signs DD[ ], and are noted in places of D, where object side surface numbers of distances are noted in[ ].

Table 2 shows values of the focal length f of the imaging lens, the back focal length Bf in terms of the air conversion distance, the F number FNo, the maximum total angle of view 2ω, and the maximum image height Ymax. (°) in the place of 2ω indicates that the unit thereof is a degree. The values shown in Table 2 are values in the case of using the d line as a reference in a state where the object at infinity is in focus.

Table 3 shows values of the variable surface distance in a state where the object at infinity is in focus and in a state where an object at an object distance of 100 mm (millimeters) is in focus.

In Table 1, the reference sign * is attached to surface numbers of aspheric surfaces, and numerical values of the paraxial radius of curvature are written into the column of the radius of curvature of the aspheric surface. In Table 4, the row of Sn shows surface numbers of the aspheric surfaces, and the rows of KA and Am (m=3, 4, 5, . . . ) shows numerical values of the aspheric surface coefficients for each aspheric surface. The "E±n" (n: an integer) in numerical values of the aspheric surface coefficients of Table 4 indicates "×10$^{\pm n}$". KA and Am are the aspheric surface coefficients in the aspheric surface expression represented by the following expression.

$$Zd=C\times h^2/\{1+(1-KA\times C^2\times h^2)^{1/2}\}+\Sigma Am\times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | νd |
|---|---|---|---|---|
| 1 | 31.25016 | 0.900 | 1.78472 | 25.68 |
| 2 | 23.95229 | DD [2] | | |
| 3 | 17.30507 | 1.920 | 1.83481 | 42.72 |
| 4 | 69.11480 | 0.800 | | |
| 5 (St) | ∞ | 7.500 | | |
| 6 | −11.70192 | 0.900 | 1.92286 | 18.90 |
| 7 | −267.56310 | 0.250 | | |
| 8 | −957.12915 | 3.780 | 2.00100 | 29.13 |
| 9 | −14.26798 | 0.200 | | |
| *10 | 25.33378 | 3.510 | 1.77377 | 47.17 |
| *11 | 522.71357 | DD [11] | | |
| *12 | −8.11531 | 1.490 | 1.69350 | 53.18 |
| *13 | −8.63872 | 0.520 | | |
| 14 | −68.06476 | 2.410 | 1.69895 | 30.13 |
| 15 | −33.33874 | 2.840 | | |
| *16 | −16.18915 | 1.100 | 1.82115 | 24.06 |
| *17 | 159.54120 | 0.500 | | |
| 18 | 109.18792 | 2.090 | 2.00100 | 29.13 |
| 19 | ∞ | 2.500 | | |
| 20 | ∞ | 1.300 | 1.51680 | 64.20 |
| 21 | ∞ | | | |

TABLE 2

Example 1

| | |
|---|---|
| f | 23.707 |
| Bf | 3.669 |
| FNo. | 2.12 |
| 2ω(°) | 61.6 |
| Ymax | 14.200 |

TABLE 3

Example 1

| | Infinity | 100 mm |
|---|---|---|
| DD[2] | 5.380 | 1.441 |
| DD[11] | 3.440 | 7.379 |

TABLE 4

Example 1

| Sn | 10 | 11 | 12 |
|---|---|---|---|
| KA | 0.0000000E+00 | 0.0000000E+00 | 0.0000000E+00 |
| A3 | −3.9833731E−04 | −4.6818181E−04 | −3.1142286E−04 |
| A4 | 4.1596326E−04 | 5.7542796E−04 | 2.2350938E−03 |
| A5 | −8.1807875E−05 | −1.3197868E−04 | −5.2850919E−04 |
| A6 | −3.4486377E−05 | −7.0944090E−06 | −3.2918743E−05 |
| A7 | 1.8406738E−05 | 7.7042688E−06 | 3.8552327E−05 |
| A8 | −1.7093504E−06 | −9.0712684E−07 | −2.2328332E−06 |
| A9 | −6.7955338E−07 | −9.2945306E−08 | −1.2314991E−06 |
| A10 | 1.6623252E−07 | 2.9087983E−08 | 1.2947987E−07 |
| A11 | 2.3916071E−09 | −1.9402948E−09 | 2.1975456E−08 |

TABLE 4-continued

Example 1

| | | | |
|---|---|---|---|
| A12 | −4.4437470E−09 | −1.7023942E−10 | −3.0493378E−09 |
| A13 | 3.1032405E−10 | 5.2164123E−11 | −2.3413982E−10 |
| A14 | 5.0068234E−11 | −3.9193369E−12 | 3.9723899E−11 |
| A15 | −6.8210069E−12 | −2.9128246E−13 | 1.5048213E−12 |
| A16 | −1.4835636E−13 | 5.9057021E−14 | −3.0228728E−13 |
| A17 | 5.6165184E−14 | −1.2477036E−15 | −5.4967256E−15 |
| A18 | −1.2131524E−15 | −2.1811209E−16 | 1.2703620E−15 |
| A19 | −1.7053253E−16 | 1.1787594E−17 | 9.2990381E−18 |
| A20 | 7.4268618E−18 | −9.7679360E−20 | −2.3219033E−18 |

| Sn | 13 | 16 | 17 |
|---|---|---|---|
| KA | 0.0000000E+00 | 0.0000000E+00 | 0.0000000E+00 |
| A3 | −3.4195295E−04 | −4.3063658E−03 | −4.1304319E−03 |
| A4 | 2.4153610E−03 | 1.5342670E−03 | 6.8085769E−04 |
| A5 | −6.5449268E−04 | −1.7303681E−04 | 9.2160698E−05 |
| A6 | −1.3340682E−05 | −2.8729549E−05 | −3.6696711E−05 |
| A7 | 4.2431390E−05 | 1.5042998E−05 | 2.8463250E−06 |
| A8 | −3.6104163E−06 | −1.8034690E−06 | 1.7513732E−07 |
| A9 | −1.1981565E−06 | −2.4265182E−07 | −1.0699470E−07 |
| A10 | 1.6420913E−07 | 8.2218458E−08 | 2.1367836E−08 |
| A11 | 1.8460565E−08 | −3.0018118E−09 | −2.6175713E−10 |
| A12 | −3.4450163E−09 | −1.2904883E−09 | −4.4934570E−10 |
| A13 | −1.5823528E−10 | 1.4390975E−10 | 3.4711659E−11 |
| A14 | 4.0229621E−11 | 6.2562404E−12 | 4.1584168E−12 |
| A15 | 8.0078810E−13 | −1.6261458E−12 | −5.7426998E−13 |
| A16 | −2.8288770E−13 | 1.6228762E−14 | −2.4546756E−15 |
| A17 | −1.7454987E−15 | 8.8266973E−15 | 2.7564294E−15 |
| A18 | 1.0753843E−15 | −3.3342061E−16 | −5.6800312E−17 |
| A19 | 2.2370817E−18 | −1.5554742E−17 | −5.7133904E−18 |
| A20 | −1.8376402E−18 | 8.1553202E−19 | 2.0906891E−19 |

Figure 5:
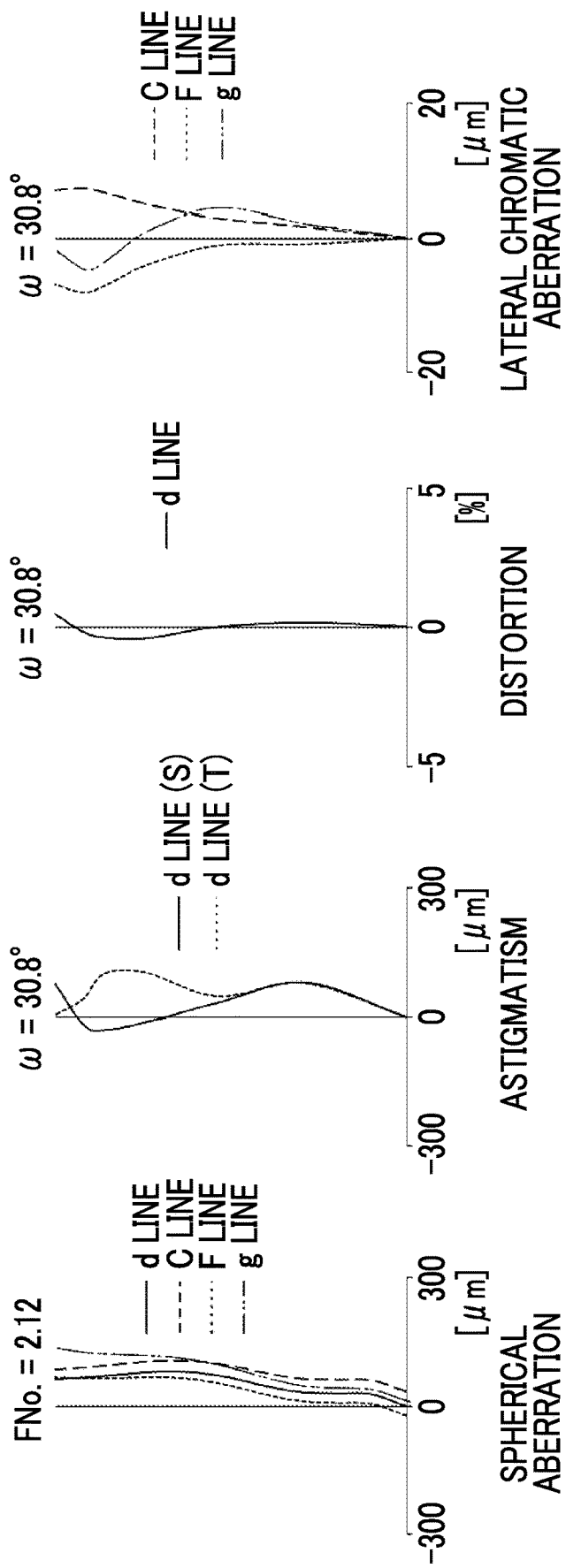
FIG. 5 is a diagram of aberrations of the imaging lens of Example 1 of the present invention.

FIG. 5 shows aberration diagrams in a state where an object at infinity is brought into focus through the imaging lens of Example 1. In FIG. 5, in order from the left side, spherical aberration, astigmatism, distortion, and lateral chromatic aberration are shown. In the spherical aberration diagram, aberrations at the d line, the C line, the F line, and the g line are indicated by the solid line, the long dashed line, the short dashed line, and the chain double-dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the chain double-dashed line. The FNo. of the spherical aberration diagram is synonymous with the FNo of the table of specification, and indicates the F number. In the other aberration diagrams, ω indicates a half angle of view.

Symbols, meanings, description methods, and illustration methods of the respective data pieces according to Example 1 are the same as those in the following examples unless otherwise noted. Therefore, in the following description, repeated description will be omitted.

Example 2

FIG. 2 shows a cross-sectional view of the lens configuration of the imaging lens of Example 2. The imaging lens of Example 2 consists of, in order from the object side to the image side, a first lens group G1 having a positive refractive power, an aperture stop St, a second lens group G2 having a positive refractive power, and a third lens group G3 having a negative refractive power.

The first lens group G1 consists of, in order from the object side to the image side, two lenses of a negative lens L11 and a positive lens L12. The second lens group G2 consists of, in order from the object side to the image side, three lenses of a negative lens L21, a positive lens L22, and a positive lens L23. The third lens group G3 consists of, in order from the object side to the image side, three lenses of a positive lens L31, a positive lens L32, and a negative lens L33.

During focusing from the object at infinity to the closest object, the entire first lens group G1, the aperture stop St, and the entire second lens group G2 integrally move to the object side along the optical axis Z, and the other lenses remain stationary with respect to the image plane Sim. During vibration reduction, only the two lenses L32 and L33 move in the direction intersecting the optical axis Z.

Figure 6:
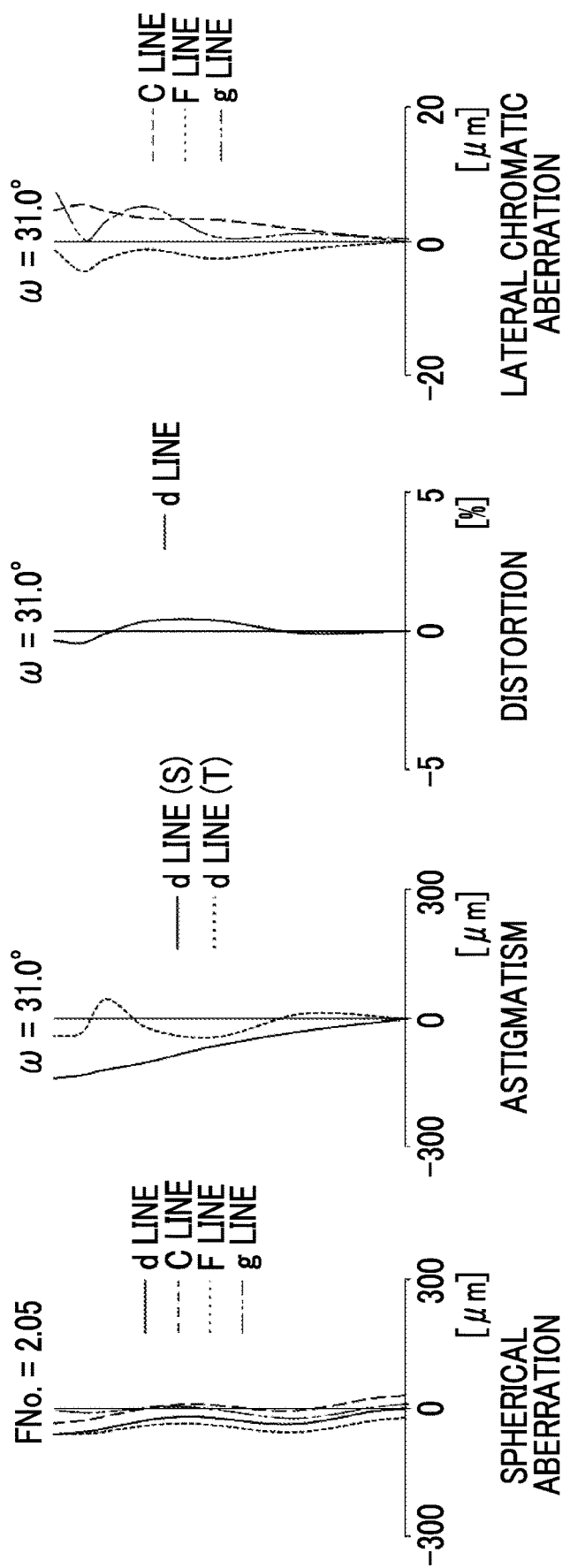
FIG. 6 is a diagram of aberrations of the imaging lens of Example 2 of the present invention.

Regarding the imaging lens of Example 2, Table 5 shows basic lens data, Table 6 shows a specification, Table 7 shows variable surface distances, and Table 8 shows aspheric surface coefficients. FIG. 6 shows aberration diagrams in a state where the object at infinity is in focus.

TABLE 5

Example 2

| Sn | R | D | Nd | νd |
|---|---|---|---|---|
| 1 | 31.68587 | 0.900 | 1.69895 | 30.13 |
| 2 | 22.47533 | 1.080 | | |
| 3 | 16.69036 | 2.060 | 1.80400 | 46.53 |
| 4 | 84.11396 | 0.800 | | |
| 5(St) | ∞ | 6.590 | | |
| 6 | −12.21734 | 0.900 | 1.89286 | 20.36 |
| 7 | 254.07650 | 0.150 | | |
| 8 | 249.98649 | 4.310 | 2.00100 | 29.13 |
| 9 | −15.31492 | 0.200 | | |

TABLE 5-continued

Example 2

| Sn | R | D | Nd | νd |
|---|---|---|---|---|
| *10 | 26.36068 | 2.720 | 1.77250 | 49.46 |
| *11 | 418.17414 | DD[11] | | |
| *12 | −12.41290 | 1.880 | 1.82115 | 24.06 |
| *13 | −11.65885 | 1.290 | | |
| *14 | −11.48805 | 2.230 | 1.83441 | 37.28 |
| *15 | −7.69664 | 1.800 | | |
| *16 | −13.39928 | 2.140 | 1.82115 | 24.06 |
| *17 | 53.99146 | 2.500 | | |
| 18 | ∞ | 1.300 | 1.51680 | 64.20 |
| 19 | ∞ | | | |

TABLE 6

Example 2

| | |
|---|---|
| f | 23.704 |
| Bf | 6.716 |
| FNo | 2.05 |
| 2ω(°) | 62.0 |
| Ymax | 14.200 |

TABLE 7

Example 2

| | Infinity | 100 mm |
|---|---|---|
| DD[11] | 2.840 | 7.161 |

TABLE 8

Example 2

| Sn | 10 | 11 | 12 | 13 |
|---|---|---|---|---|
| KA | 0.0000000E+00 | 0.0000000E+00 | 0.0000000E+00 | 0.0000000E+00 |
| A3 | −1.7300915E−04 | −7.5619316E−05 | −1.5277771E−03 | −1.5601742E−03 |
| A4 | 16702823E−04 | 2.5365243E−04 | 1.6045583E−03 | 1.6095976E−03 |
| A5 | −3.9084960E−06 | −6.6235210E−05 | −2.4007569E−04 | −2.8102503E−04 |
| A6 | −3.2096077E−05 | 6.3803638E−06 | −4.9408867E−05 | −3.0460152E−05 |
| A7 | 1.0082751E−05 | 6.4513390E−07 | 1.8750750E−05 | 1.7617922E−05 |
| A8 | −8.6560494E−08 | −7.4611872E−07 | 5.6019214E−08 | −7.6297184E−07 |
| A9 | −4.7125853E−07 | 2.0972112E−07 | −5.6235501E−07 | −4.2015886E−07 |
| A10 | 6.9196180E−08 | 1.2218969E−09 | 3.0572642E−08 | 4.2146784E−08 |
| A11 | 5.1496653E−09 | −9.0767157E−09 | 8.7892275E−09 | 4.6697422E−09 |
| A12 | −2.1214554E−09 | 7.8478469E−10 | −7.0946678E−10 | −6.9594830E−10 |
| A13 | 1.0123611E−10 | 1.5299966E−10 | −7.5544812E−11 | −1.8180162E−11 |
| A14 | 2.4009373E−11 | −2.0859230E−11 | 6.7969758E−12 | 4.8257697E−12 |
| A15 | −2.9838067E−12 | −1.1433371E−12 | 3.4852875E−13 | −7.0346100E−14 |
| A16 | −5.8070613E−14 | 2.2994627E−13 | −2.5576874E−14 | −6.5182438E−15 |
| A17 | 2.6577389E−14 | 2.7315480E−15 | −8.2829191E−16 | 7.1264091E−16 |
| A18 | −8.0059172E−16 | −1.1507441E−15 | −1.0743562E−17 | −7.7092628E−17 |
| A19 | −8.1750412E−17 | 3.8509676E−18 | 9.7106094E−19 | −1.1673406E−18 |
| A20 | 4.3567841E−18 | 2.0532975E−18 | 2.2032378E−19 | 2.6646842E−19 |

| Sn | 14 | 15 | 16 | 17 |
|---|---|---|---|---|
| KA | 0.0000000E+00 | 0.0000000E+00 | 1.0000000E+00 | 1.0000000E+00 |
| A3 | 8.1117822E−04 | 5.4685930E−05 | 1.7412195E−04 | 9.2759539E−04 |
| A4 | 4.8650246E−04 | 2.2495654E−03 | 3.1859169E−03 | 6.5902894E−05 |
| A5 | −4.4021035E−04 | −6.2229639E−04 | −2.4495837E−04 | 3.7095551E−04 |
| A6 | 1.3735346E−04 | 7.0771052E−05 | −8.6869134E−05 | −6.0199264E−05 |
| A7 | 1.2861018E−05 | 3.4645130E−05 | 1.6213925E−05 | −1.9922696E−05 |
| A8 | −9.7232138E−06 | −1.0332148E−05 | −1.4962539E−06 | 3.8052659E−06 |
| A9 | 3.7684852E−07 | −3.9543857E−07 | −2.2097762E−07 | 3.9851023E−07 |
| A10 | 2.7805270E−07 | 3.8267026E−07 | 1.3404595E−07 | −1.0678965E−07 |
| A11 | −2.6365786E−08 | −1.6314694E−08 | −8.7987673E−09 | −2.3702058E−09 |
| A12 | −3.8868140E−09 | −6.6802410E−09 | −2.9432536E−09 | 1.5711862E−09 |

TABLE 8-continued

| | | Example 2 | | |
|---|---|---|---|---|
| A13 | 5.6461378E−10 | 5.8609617E−10 | 3.5747878E−10 | −3.0965640E−11 |
| A14 | 2.4086559E−11 | 5.5885900E−11 | 2.6858842E−11 | −1.2510848E−11 |
| A15 | −6.0646354E−12 | −7.7251692E−12 | −5.2066536E−12 | 6.1114580E−13 |
| A16 | 1.7091417E−14 | −1.4235623E−13 | −4.6413693E−14 | 4.6078927E−14 |
| A17 | 3.2028530E−14 | 4.7330739E−14 | 3.5166272E−14 | −3.6845726E−15 |
| A18 | −8.4659859E−16 | −7.7416753E−16 | −7.8631288E−16 | −3.0918297E−17 |
| A19 | −6.8908183E−17 | −1.1242375E−16 | −9.2125952E−17 | 8.0309130E−18 |
| A20 | 2.8527015E−18 | 4.0528901E−18 | 3.7449126E−18 | −1.7182650E−19 |

Example 3

Figure 3:
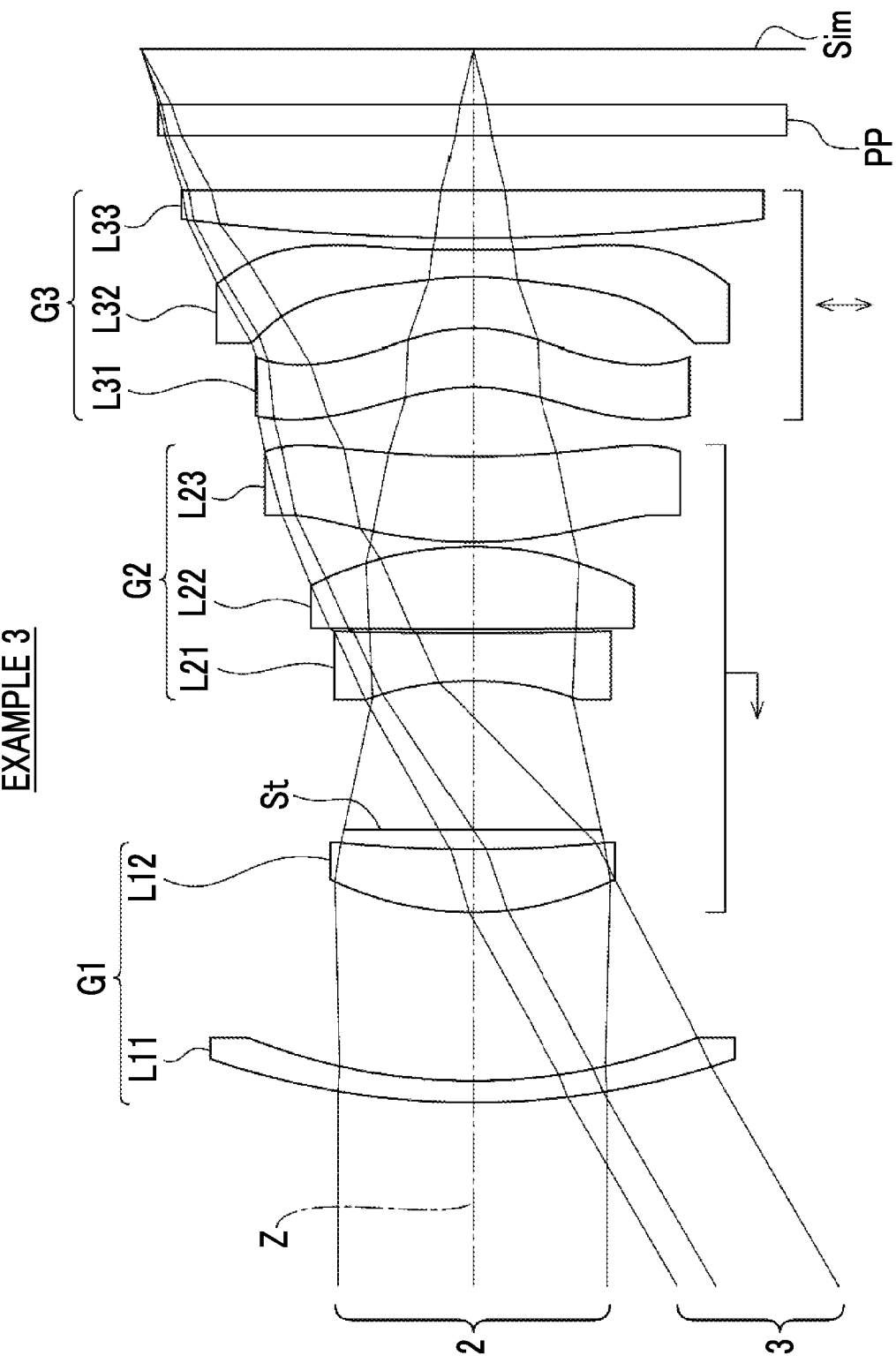
FIG. 3 is a cross-sectional view illustrating a configuration of an imaging lens of Example 3 of the present invention.

FIG. 3 shows a cross-sectional view of the lens configuration of the imaging lens of Example 3. The imaging lens of Example 3 consists of, in order from the object side to the image side, a first lens group G1 having a positive refractive power, an aperture stop St, a second lens group G2 having a positive refractive power, and a third lens group G3 having a negative refractive power.

The first lens group G1 consists of, in order from the object side to the image side, two lenses of a negative lens L11 and a positive lens L12. The second lens group G2 consists of, in order from the object side to the image side, three lenses of a negative lens L21, a positive lens L22, and a positive lens L23. The third lens group G3 consists of, in order from the object side to the image side, three lenses of a positive lens L31, a negative lens L32, and a positive lens L33.

During focusing from the object at infinity to the closest object, the lens L12, the aperture stop St, and the entire second lens group G2 integrally move to the object side along the optical axis Z, and the other lenses remain stationary with respect to the image plane Sim. During vibration reduction, the entire third lens group G3 moves in the direction intersecting the optical axis Z, and the other lenses remain stationary with respect to the image plane Sim.

Figure 7:
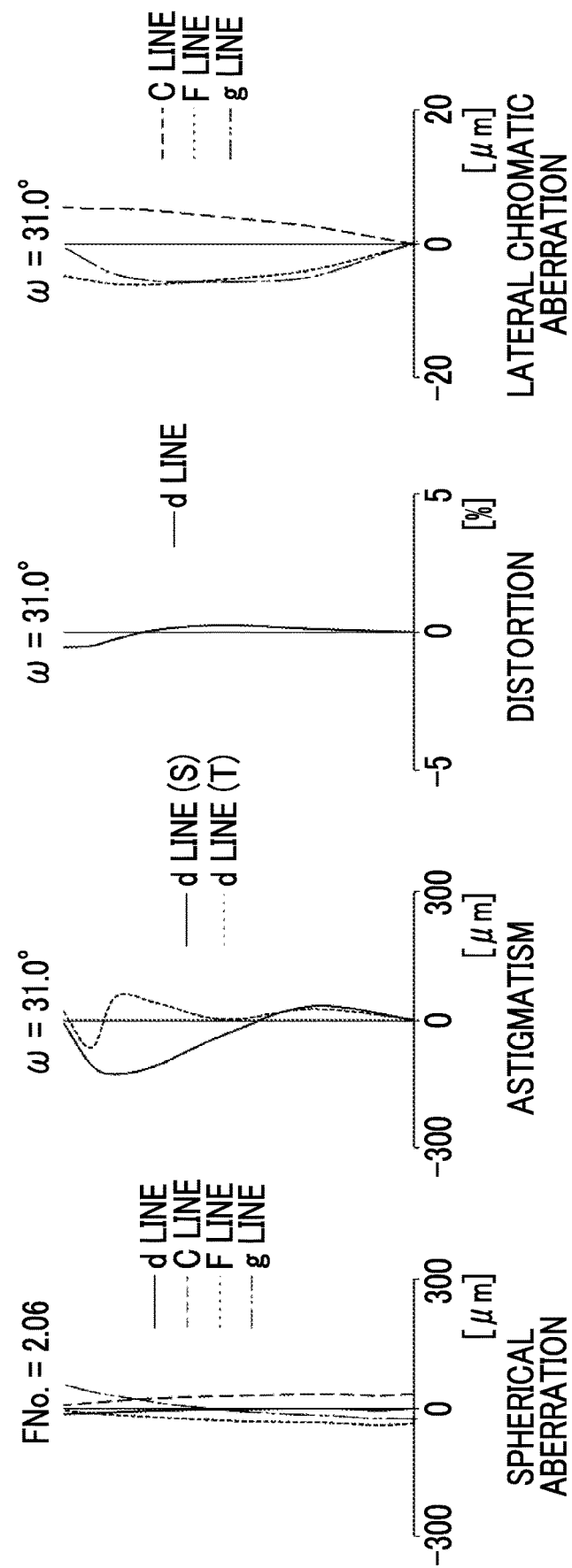
FIG. 7 is a diagram of aberrations of the imaging lens of Example 3 of the present invention.

Regarding the imaging lens of Example 3, Table 9 shows basic lens data, Table 10 shows a specification, Table 11 shows variable surface distances, and Table 12 shows aspheric surface coefficients. FIG. 7 shows aberration diagrams in a state where the object at infinity is in focus.

TABLE 9

| | Example 3 | | | |
|---|---|---|---|---|
| Sn | R | D | Nd | vd |
| 1 | 36.06454 | 0.900 | 1.51742 | 52.43 |
| 2 | 26.94734 | DD[2] | | |
| 3 | 14.44034 | 2.640 | 1.72916 | 54.68 |
| 4 | 59.00052 | 0.800 | | |
| 5(St) | ∞ | 6.170 | | |
| 6 | −13.89352 | 1.980 | 1.92286 | 18.90 |
| 7 | 249.99496 | 0.160 | | |
| 8 | 579.52958 | 3.410 | 2.00100 | 29.13 |
| 9 | −15.78640 | 0.200 | | |
| *10 | 19.95846 | 3.530 | 1.77250 | 49.46 |
| *11 | 44.67426 | DD[11] | | |
| *12 | −9.01492 | 2.420 | 1.77250 | 49.46 |
| *13 | −6.90131 | 2.120 | | |
| *14 | −10.93619 | 1.100 | 1.80610 | 40.73 |
| *15 | −641.79209 | 0.500 | | |
| 16 | 100.39410 | 1.970 | 2.00100 | 29.13 |
| 17 | ∞ | 2.300 | | |
| 18 | ∞ | 1.300 | 1.51680 | 64.20 |
| 19 | ∞ | | | |

TABLE 10

| | Example 3 |
|---|---|
| f | 23.733 |
| Bf | 5.435 |
| FNo | 2.06 |
| 2ω(°) | 62.0 |
| Ymax | 14.200 |

TABLE 11

| | Example 3 | |
|---|---|---|
| | Infinity | 100 mm |
| DD[2] | 6.940 | 2.795 |
| DD[11] | 2.870 | 7.015 |

TABLE 12

| | Example 3 | | |
|---|---|---|---|
| Sn | 10 | 11 | 12 |
| KA | 0.0000000E+00 | 0.0000000E+00 | 0.0000000E+00 |
| A3 | 9.3510881E−05 | 5.3711507E−04 | 7.5281976E−04 |
| A4 | −2.1688433E−04 | −4.2842270E−04 | −7.8473817E−05 |
| A5 | 1.3814513E−04 | 1.4237459E−04 | 3.3319016E−05 |
| A6 | −4.4941630E−05 | 4.0372016E−06 | 1.0008140E−04 |
| A7 | 5.0813026E−06 | −1.1890304E−05 | −1.8297029E−05 |
| A8 | 1.1793243E−06 | 1.6155980E−06 | −3.5982063E−06 |
| A9 | −5.2477076E−07 | 3.6143765E−07 | 1.1215332E−06 |
| A10 | 5.2146787E−08 | −1.0656005E−07 | 2.3963244E−08 |
| A11 | 9.1991168E−09 | −9.3570945E−10 | −3.0027977E−08 |
| A12 | −2.5773443E−09 | 2.8375138E−09 | 1.1938263E−09 |
| A13 | 7.4178779E−11 | −1.9166019E−10 | 4.2211798E−10 |
| A14 | 3.8123044E−11 | −3.4455027E−11 | −3.0857993E−11 |
| A15 | −3.8657079E−12 | 4.3848055E−12 | −3.1701611E−12 |
| A16 | −1.6649432E−13 | 1.3860466E−13 | 3.1210346E−13 |
| A17 | 4.0494607E−14 | −3.9595839E−14 | 1.1452799E−14 |
| A18 | −7.8859478E−16 | 6.9738295E−16 | −1.4504417E−15 |
| A19 | −1.4101266E−16 | 1.3039696E−16 | −1.3848427E−17 |
| A20 | 6.4702177E−18 | −5.4922505E−18 | 2.4913455E−18 |
| Sn | 13 | 14 | 15 |
| KA | 0.0000000E+00 | 9.0000000E−01 | 9.0000000E−01 |
| A3 | −1.7063725E−04 | −4.5764055E−04 | −1.3746659E−03 |
| A4 | 1.5108820E−03 | 2.5349038E−03 | 1.9778110E−03 |
| A5 | −2.1228687E−04 | 3.4567381E−04 | 1.1675563E−04 |
| A6 | 5.0360799E−05 | −1.6846237E−04 | −1.6454527E−04 |
| A7 | 6.5492590E−06 | −2.6615990E−05 | 2.3084057E−06 |
| A8 | −5.5082588E−06 | 8.1342148E−06 | 6.1812361E−06 |
| A9 | 3.2035554E−07 | 1.0154495E−06 | −3.4676643E−07 |
| A10 | 1.9156939E−07 | −2.6317819E−07 | −1.2771584E−07 |
| A11 | −2.3326861E−08 | −2.2667307E−08 | 1.1152923E−08 |
| A12 | −3.1491080E−09 | 5.5421729E−09 | 1.4798080E−09 |
| A13 | 5.7306902E−10 | 3.0712242E−10 | −1.7797760E−10 |
| A14 | 2.2294805E−11 | −7.4179073E−11 | −8.6214955E−12 |
| A15 | −7.1940369E−12 | −2.5722617E−12 | 1.5656370E−12 |
| A16 | 4.1449088E−14 | 6.1870346E−13 | 9.7340667E−15 |

TABLE 12-continued

| | Example 3 | | |
|---|---|---|---|
| A17 | 4.4016733E−14 | 1.1796559E−14 | −7.2412889E−15 |
| A18 | −1.2708904E−15 | −2.8903593E−15 | 1.3389623E−16 |
| A19 | −1.0957625E−16 | −2.4121127E−17 | 1.3850913E−17 |
| A20 | 4.7782406E−18 | 5.8950021E−18 | −4.7912373E−19 |

Example 4

Figure 4:
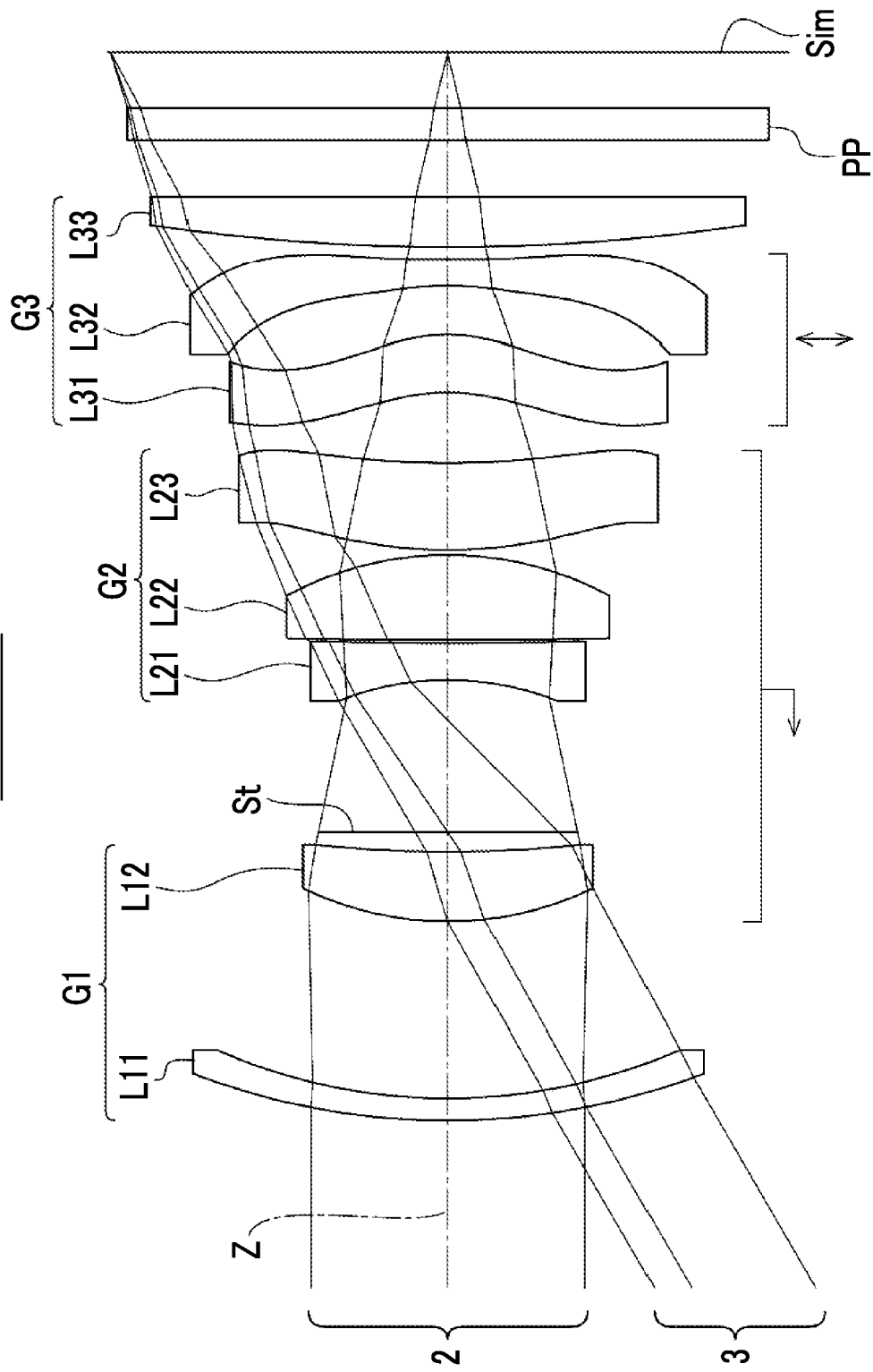
FIG. 4 is a cross-sectional view illustrating a configuration of an imaging lens of Example 4 of the present invention.

FIG. 4 shows a cross-sectional view of the lens configuration of the imaging lens of Example 4. The imaging lens of Example 4 consists of, in order from the object side to the image side, a first lens group G1 having a positive refractive power, an aperture stop St, a second lens group G2 having a positive refractive power, and a third lens group G3 having a negative refractive power.

The first lens group G1 consists of, in order from the object side to the image side, two lenses of a negative lens L11 and a positive lens L12. The second lens group G2 consists of, in order from the object side to the image side, three lenses of a negative lens L21, a positive lens L22, and a positive lens L23. The third lens group G3 consists of, in order from the object side to the image side, three lenses of a positive lens L31, a negative lens L32, and a positive lens L33.

During focusing from the object at infinity to the closest object, the lens L12, the aperture stop St, and the entire second lens group G2 integrally move to the object side along the optical axis Z, and the other lenses remain stationary with respect to the image plane Sim. During vibration reduction, only the two lenses L31 and L32 move in the direction intersecting the optical axis Z.

Figure 8:
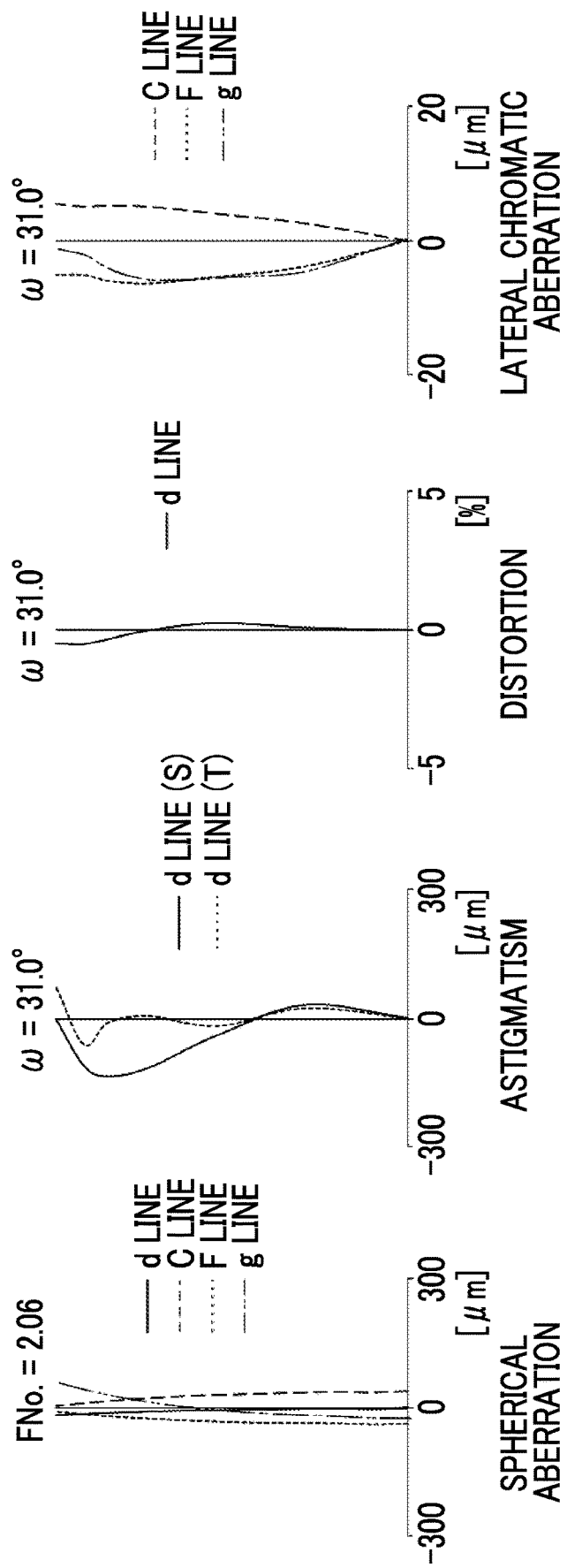
FIG. 8 is a diagram of aberrations of the imaging lens of Example 4 of the present invention.

Regarding the imaging lens of Example 4, Table 13 shows basic lens data, Table 14 shows a specification, Table 15 shows variable surface distances, and Table 16 shows aspheric surface coefficients. FIG. 8 shows aberration diagrams in a state where the object at infinity is in focus.

TABLE 13

| | Example 4 | | | |
|---|---|---|---|---|
| Sn | R | D | Nd | vd |
| 1 | 31.25005 | 0.900 | 1.51742 | 52.43 |
| 2 | 25.08930 | DD[2] | | |
| 3 | 14.44330 | 2.830 | 1.72916 | 54.68 |
| 4 | 52.81273 | 0.800 | | |
| 5(St) | ∞ | 6.190 | | |
| 6 | −12.97731 | 1.510 | 1.92286 | 18.90 |
| 7 | 249.98955 | 0.120 | | |
| 8 | 339.95950 | 3.460 | 2.00100 | 29.13 |
| 9 | −14.73550 | 0.200 | | |
| *10 | 19.94176 | 3.550 | 1.80139 | 45.45 |
| *11 | 43.21446 | DD[11] | | |
| *12 | −8.88254 | 2.330 | 1.77250 | 49.46 |
| *13 | −6.93663 | 1.990 | | |
| *14 | −10.80159 | 1.100 | 1.80610 | 40.73 |
| *15 | −398.60564 | 0.500 | | |
| 16 | 88.19997 | 2.050 | 2.00330 | 28.27 |
| 17 | ∞ | 2.300 | | |
| 18 | ∞ | 1.300 | 1.51680 | 64.20 |
| 19 | ∞ | | | |

TABLE 14

| | Example 4 |
|---|---|
| f | 23.723 |
| Bf | 5.430 |
| FNo | 2.06 |
| 2ω(°) | 62.0 |
| Ymax | 14.200 |

TABLE 15

| | Example 4 | |
|---|---|---|
| | Infinity | 100 mm |
| DD[2] | 7.160 | 3.225 |
| DD[11] | 2.860 | 6.795 |

TABLE 16

| | Example 4 | | |
|---|---|---|---|
| Sn | 10 | 11 | 12 |
| KA | 0.0000000E+00 | 0.0000000E+00 | 0.0000000E+00 |
| A3 | 1.2361536E−04 | 6.7715842E−04 | 7.3375926E−04 |
| A4 | −1.7952705E−04 | −4.1425341E−04 | 4.0577516E−05 |
| A5 | 1.2156857E−04 | 1.2653966E−04 | 2.1507325E−05 |
| A6 | −4.5631133E−05 | 6.1054567E−06 | 9.2743038E−05 |
| A7 | 6.9488431E−06 | −1.0862466E−05 | −1.6663577E−05 |
| A8 | 1.0286466E−06 | 1.3853889E−06 | −3.3484268E−06 |
| A9 | −6.2296967E−07 | 3.2594406E−07 | 1.0300140E−06 |
| A10 | 6.4737950E−08 | −9.5926166E−08 | 1.9066379E−08 |
| A11 | 1.2179748E−08 | −2.7143511E−10 | −2.7359678E−08 |
| A12 | −3.0532056E−09 | 2.5655510E−09 | 1.2662273E−09 |
| A13 | 2.4412558E−11 | −1.9885188E−10 | 3.7431375E−10 |
| A14 | 4.7053928E−11 | −3.0190412E−11 | −3.1183411E−11 |
| A15 | −3.2771863E−12 | 4.4126934E−12 | −2.7344506E−12 |
| A16 | −2.7597934E−13 | 1.0001027E−13 | 3.1687969E−13 |
| A17 | 3.7610267E−14 | −3.9589315E−14 | 8.9334538E−15 |
| A18 | −1.5761267E−16 | 8.9243256E−16 | −1.4594673E−15 |
| A19 | −1.3311089E−16 | 1.2997048E−16 | −8.5882191E−18 |
| A20 | 4.8479742E−18 | −5.9047709E−18 | 2.5198886E−18 |
| Sn | 13 | 14 | 15 |
| KA | 0.0000000E+00 | 9.0000000E−01 | 9.0000000E−01 |
| A3 | −3.4225886E−04 | −4.5371352E−05 | −9.9084334E−04 |
| A4 | 1.6788827E−03 | 2.3464362E−03 | 1.8050948E−03 |
| A5 | −2.2451202E−04 | 2.8593330E−04 | 5.7894773E−05 |
| A6 | 3.9677625E−05 | −1.5325818E−04 | −1.4918050E−04 |
| A7 | 8.8117044E−06 | −2.2409897E−05 | 6.3781714E−06 |
| A8 | −5.1320845E−06 | 7.5838102E−06 | 5.4202711E−06 |
| A9 | 1.9937443E−07 | 8.4926897E−07 | −4.9708598E−07 |
| A10 | 1.8340978E−07 | −2.5670460E−07 | −1.0474742E−07 |
| A11 | −1.9861605E−08 | −1.8649679E−08 | 1.4408163E−08 |
| A12 | −3.1019306E−09 | 5.6963902E−09 | 1.0394955E−09 |
| A13 | 5.2819868E−10 | 2.4690638E−10 | −2.2053140E−10 |
| A14 | 2.1406287E−11 | −8.1081292E−11 | −3.2950819E−12 |
| A15 | −6.6702412E−12 | −1.9950289E−12 | 1.9001009E−12 |
| A16 | 2.7162213E−14 | 7.2304074E−13 | −2.9929285E−14 |
| A17 | 4.2461358E−14 | 8.6925197E−15 | −8.6762054E−15 |
| A18 | −1.2186808E−15 | −3.6487667E−15 | 2.9780036E−16 |
| A19 | −1.0554479E−16 | −1.6806793E−17 | 1.6470191E−17 |
| A20 | 4.5661429E−18 | 8.0797604E−18 | −7.6848746E−19 |

Table 17 shows values corresponding to Conditional Expressions (1) to (5) of the imaging lenses of Examples 1 to 4. In Examples 1 to 4, the d line is set as the reference wavelength. Table 17 shows the values on the d line basis.

TABLE 17

| Expression Number | | Example 1 | Example 2 | Example 3 | Example 4 |
|---|---|---|---|---|---|
| (1) | fb/fa | 1.246 | 1.240 | 1.233 | 1.351 |
| (2) | f/Ymax | 1.670 | 1.669 | 1.671 | 1.671 |
| (3) | FNox(DD + Bf)/Ymax | 6.449 | 5.573 | 6.259 | 6.235 |
| (4) | fc/f | 0.771 | 0.828 | 0.795 | 0.785 |
| (5) | NdOIS | 1.82115 | 1.82115 | 1.80610 | 1.80610 |

As can be seen from the above data, the imaging lenses of Examples 1 to 4 each have a focusing function and a vibration reduction function, and each are configured such that the lens group moving during focusing and the lens group moving during the vibration reduction are different lens groups. Thus, the aperture stop St is configured not to move during vibration reduction. Further, in the imaging lenses of Examples 1 to 4, various aberrations are satisfactorily corrected, and high optical performance is realized.

Figure 9:
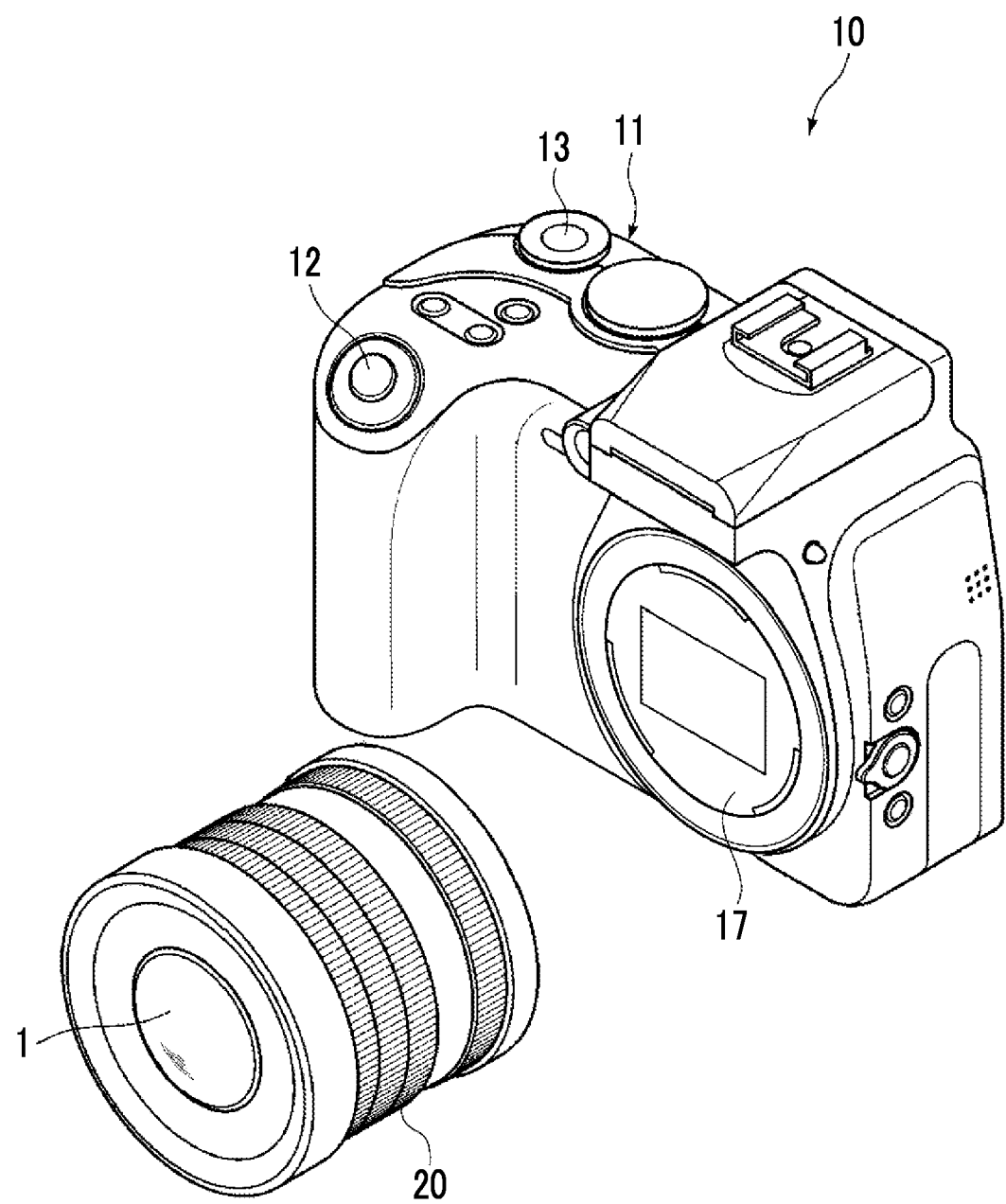
FIG. 9 is a perspective view of an imaging apparatus according to an embodiment of the present invention.

Next, an imaging apparatus according to an embodiment of the present invention will be described. FIG. 9 is a perspective view of a camera 10 as an imaging apparatus according to an embodiment of the present invention. The camera 10 shown in FIG. 9 is a mirrorless digital camera in which the interchangeable lens 20 is detachably mounted on the camera body 11. The interchangeable lens 20 is configured to include the imaging lens 1 according to the above-mentioned embodiment of the present invention housed in a lens barrel. The camera 10 comprises a camera body 11, and a shutter button 12 and a power button 13 are provided on an upper surface of the camera body 11. An imaging aperture, through which light from an imaging target is incident, is provided at the center on the front surface of the camera body 11. A mount 17 is provided at a position corresponding to the imaging aperture. The interchangeable lens 20 is mounted on the camera body 11 with the mount 17 interposed therebetween. In the camera body 11, there are provided an imaging element (not shown in the drawing), a signal processing circuit (not shown in the drawing), a storage medium (not shown in the drawing), and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium records the generated image. The camera 10 is able to capture a still image or a moving image by pressing the shutter button 12, and is able to store image data, which is obtained through imaging, in the storage medium.

Figure 10:
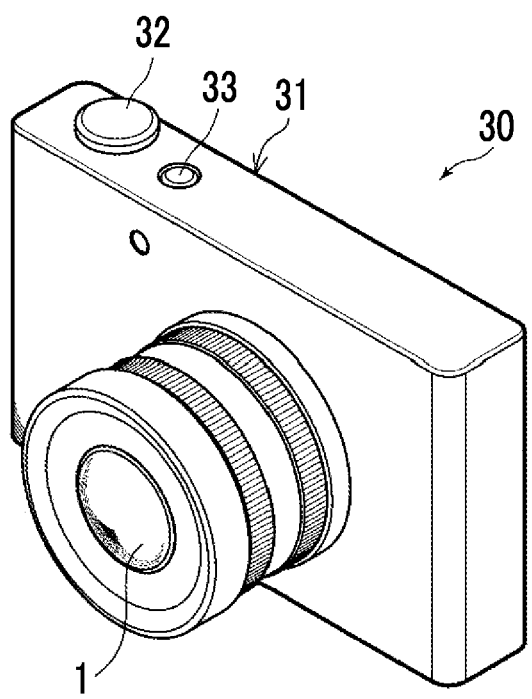
FIG. 10 is a perspective view of an imaging apparatus according to another embodiment of the present invention.

FIG. 10 shows a perspective view of a camera 30 as an imaging apparatus according to another embodiment of the present invention. The camera 30 shown in FIG. 10 is a so-called lens-integrated digital camera in which a lens and a camera body are integrally formed. The camera 30 comprises a camera body 31, where the shutter button 32 and the power button 33 are provided on the upper surface of the camera body 31, and the imaging lens 1 according to the embodiment of the present invention is provided on the front surface of the camera body 31. In the camera body 31, there are provided an imaging element (not shown in the drawing), a signal processing circuit (not shown in the drawing), a storage medium (not shown in the drawing), and the like. The imaging element such as a charge coupled device (CCD) or a complementary metal oxide semiconductor (CMOS) outputs a captured image signal based on a subject image which is formed through the imaging lens 1. The signal processing circuit generates an image through processing of the captured image signal which is output from the imaging element. The storage medium records the generated image. The camera 30 is able to capture a still image or a moving image by pressing the shutter button 32, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

Further, the imaging apparatus according to the above-mentioned embodiment of the present invention is not limited to the above examples, and may be modified into various forms such as cameras other than a mirrorless type, a film camera, and a video camera.

What is claimed is:

1. An imaging lens consisting of, in order from an object side to an image side:
   a first lens group that has a refractive power;
   a stop;
   a second lens group that has a positive refractive power; and
   a third lens group that has a negative refractive power,
   wherein the second lens group includes at least one negative lens and at least one positive lens,
   wherein the second lens group moves along an optical axis, and the third lens group remains stationary with respect to an image plane, during focusing from an object at infinity to a closest object,
   wherein image blur correction is performed by moving only the entire third lens group or only a part of the third lens group as a vibration reduction lens group in a direction intersecting the optical axis, and
   wherein in a state where the object at infinity is in focus, assuming that
      a focal length of the imaging lens is f,
      a maximum image height is Ymax,
      an F number of the imaging lens is FNo,
      a distance on the optical axis from a lens surface closest to the object side to a lens surface closest to the image side is DD, and
      a back focal length of the imaging lens at an air conversion distance is Bf,
   Conditional Expressions (2) and (3) are satisfied, which are represented by $$1 < f/Y\max < 2.3 \quad (2), \text{ and}$$

$$3\ 0.4 < FNo \times (DD + Bf)/Y\max < 10 \quad (3).$$

2. The imaging lens according to claim 1,
   wherein the vibration reduction lens group has a negative refractive power, and
   wherein in a state where the object at infinity is in focus, assuming that
      a composite focal length from a lens closest to the object side in the first lens group to a lens disposed adjacent to the object side in the vibration reduction lens group is fa, and a composite focal length from the lens closest to the object side in the first lens group to a lens closest to the image side in the vibration reduction lens group is fb, Conditional Expression (1) is satisfied, which is represented by $$1.1 < fb/fa < 1.5 \tag{1}$$

3. The imaging lens according to claim 2, wherein Conditional Expression (1-1) is satisfied, which is represented by $$1.2 \leq fb/fa < 1.4 \tag{1-1}$$

4. The imaging lens according to claim 1, wherein focusing from the object at infinity to the closest object is performed by integrally moving the entire first lens group, the stop, and the entire second lens group toward the object side, or focusing from the object at infinity to the closest object is performed by integrally moving a part of the first lens group including a lens closest to the image side in the first lens group, the stop, and the entire second lens group toward the object side.

5. The imaging lens according to claim 4, wherein in a state where the object at infinity is in focus, assuming that a composite focal length of the lenses moving during focusing is fc, and a focal length of the imaging lens is f, Conditional Expression (4) is satisfied, which is represented by $$0.6 < fc/f < 1 \tag{4}$$

6. The imaging lens according to claim 5, wherein Conditional Expression (4-1) is satisfied, which is represented by $$0.65 < fc/f < 0.9 \tag{4-1}$$

7. The imaging lens according to claim 1, wherein the second lens group includes a negative lens concave toward the object side and a positive lens convex toward the image side.

8. The imaging lens according to claim 1, wherein the vibration reduction lens group has a negative refractive power, and wherein the vibration reduction lens group includes at least one negative lens, wherein assuming that a refractive index of a negative lens, which has a smallest absolute value of the focal length among lenses in the vibration reduction lens group, at the d line is NdOIS, Conditional Expression (5) is satisfied, which is represented by $$1.7 < NdOIS \tag{5}$$

9. The imaging lens according to claim 8, wherein Conditional Expression (5-1) is satisfied, which is represented by $$1.75 < NdOIS < 2.1 \tag{5-1}$$

10. The imaging lens according to claim 1, wherein the first lens group has a positive refractive power.

11. The imaging lens according to claim 1, wherein the vibration reduction lens group consists of three or less lenses.

12. The imaging lens according to claim 1, wherein the vibration reduction lens group includes at least one aspheric lens surface having an inflection point.

13. The imaging lens according to claim 1, wherein a total number of lenses included in the first lens group and lenses included in the second lens group is seven or less.

14. An imaging apparatus comprising the imaging lens according to claim 1.

* * * * *